United States Patent
Boers et al.

(10) Patent No.: US 7,911,977 B2
(45) Date of Patent: Mar. 22, 2011

(54) DESIGNATED ROUTER ASSIGNMENT PER MULTICAST GROUP ADDRESS/RANGE

(75) Inventors: Arjen Boers, Calafell (ES); Ijsbrand Wijnands, Leuven (BE)

(73) Assignee: Cisco Technology, Inc., San Jose, CA (US)

( * ) Notice: Subject to any disclaimer, the term of this patent is extended or adjusted under 35 U.S.C. 154(b) by 862 days.

(21) Appl. No.: 11/140,856

(22) Filed: May 31, 2005

(65) Prior Publication Data

US 2006/0268869 A1 Nov. 30, 2006

(51) Int. Cl.
*H04J 3/26* (2006.01)

(52) U.S. Cl. .......... 370/255; 370/401; 370/432; 709/238

(58) Field of Classification Search ............... 707/10; 709/201, 242, 238, 239; 719/328; 370/389, 370/390, 401, 432, 351, 254, 255, 238
See application file for complete search history.

(56) References Cited

U.S. PATENT DOCUMENTS

| | | | | |
|---|---|---|---|---|
| 6,507,863 | B2 * | 1/2003 | Novaes | 709/201 |
| 6,631,420 | B1 * | 10/2003 | Li et al. | 709/242 |
| 6,633,765 | B1 * | 10/2003 | Maggenti | 455/503 |
| 6,707,796 | B1 * | 3/2004 | Li | 370/254 |
| 6,791,980 | B1 * | 9/2004 | Li | 370/390 |
| 6,847,638 | B1 * | 1/2005 | Wu et al. | 370/389 |
| 7,013,469 | B2 * | 3/2006 | Smith et al. | 719/328 |
| 7,310,335 | B1 * | 12/2007 | Garcia-Luna-Aceves et al. | 370/390 |
| 2002/0150094 | A1 * | 10/2002 | Cheng et al. | 370/389 |
| 2004/0071137 | A1 * | 4/2004 | He et al. | 370/390 |
| 2005/0149531 | A1 * | 7/2005 | Srivastava | 707/10 |
| 2006/0018253 | A1 * | 1/2006 | Windisch et al. | 370/216 |
| 2006/0262792 | A1 * | 11/2006 | Rokui | 370/390 |
| 2006/0268869 | A1 * | 11/2006 | Boers et al. | 370/390 |
| 2008/0151808 | A1 * | 6/2008 | O'Neill | 370/312 |

OTHER PUBLICATIONS

Estrin, D. et al., "Protocol Independent Multicase-Sparse Mode (PIM-SM): Protocol Specification"; Network Working Group; Request for Comments: 2362; Jun. 1998; 66 pages.

Bhattacharyya, S., "An Overview of Source-Specific Multicast (SSM)"; Network Working Group; Request for Comments: 3569; Jul. 2003; 14 pages.

* cited by examiner

*Primary Examiner* — Seema S Rao
*Assistant Examiner* — Mon Cheri S Davenport
(74) *Attorney, Agent, or Firm* — Campbell Stephenson LLP

(57) ABSTRACT

Each of several routers connected to a LAN elects the same router as the designated router for a multicast group identified by a multicast address. Each of the several routers implements a method for electing the designated router. The method includes in one embodiment, generating several values corresponding to the several routers, respectively. The several values are generated as a function of the several routers' IP addresses, respectively, and an IP address of a first multicast group. The values, in one embodiment, are then compared to determine which is the largest. Thereafter each router elects as the designated router for the multicast group, the router corresponding to the largest value.

18 Claims, 5 Drawing Sheets

| Entry | Multicast Address | Designated Router |
|---|---|---|
| 1 | IPAG 3 | R8 |
| 2 | IPAG 1 | R6 |
| 3 | IPAG 2 | R7 |
| 4 | IPAG 5 | R8 |
| 5 | IPAG 10 | R6 |

DESIGNATED ROUTER ASSIGNMENT PER MULTICAST GROUP ADDRESS/RANGE

BACKGROUND OF THE INVENTION

Unicast and multicast are two well-known techniques for transmitting data packets between sources and receivers via a packet-switched network (hereinafter network). Unicast is a point-to-point communication technique in which data packets are transmitted between a single source and a single receiver. Multicast allows a source or several sources to transmit data packets simultaneously to select receivers, i.e., those receivers in a multicast group. During multicast transmission, data packets are replicated by multicast enabled routers at points within the network where the communication path diverges to separate receivers of a multicast group. In this fashion, multicast protocols deliver data to multiple receivers without burdening the source or consuming excessive network bandwidth.

There are several different multicast protocols including: protocol independent multicast-dense mode (PIM-DM), protocol independent multicast-sparse mode (PIM-SM), protocol independent source specific mode (PIM-SSM), etc. The PIM-SM protocol may be defined in internet engineering tasks force (IETF), Request for Comments (RFC) 2362 entitled, "Protocol Independent Multicast-Sparse Mode (PIM-SM): Protocol Specification," published in June 1998, and hereby incorporated by reference in its entirety. Subsequent revisions to this document are also incorporated herein by reference in their entirety. The PIM-SSM protocol may be defined in RFC 3569 entitled, "An Overview of Source Specific Multicast (SSM)," published in July 2003 and hereby incorporated by reference in its entirety. Subsequent revisions of this document are also incorporated herein by reference in their entirety.

Multicast groups are typically identified by multicast IP addresses. Multicast IP addresses typically fall in the class D range of the IPv4 address space. While the present invention will be described with reference to IPv4 address space, it should be noted that the present invention should not be limited thereto. Indeed, the present invention may find application in networks employing the IPv6 address space. A multicast source is a host that sends data packets with the destination IP address set to the multicast group IP address.

As noted above, multicast data packets are replicated by multicast enabled routers in networks at points where communication paths diverge to separate receivers of multicast groups. The communication path is known as a multicast distribution tree. Data flow through the multicast distribution tree is sometimes referenced in terms of upstream and downstream. Downstream is in the direction toward the receivers. Upstream is in the direction toward the source. Routers keep track of the incoming and outgoing interfaces for each multicast group, which is known as multicast forwarding state. The incoming interface of a router for a multicast group is sometimes referred to as the IIF. The outgoing interface lists within a router for a multicast group is sometimes referred to as the OIL.

Multicast routing involves a significant paradigm change from standard Unicast routing. In general, routers make Unicast routing decisions based on the destination IP address of a Unicast packet. When a Unicast packet arrives at a router, the router looks up the destination IP address of the data packet in its routing table. The routing table tells the router out from which interface to forward Unicast data packets for each destination IP address. In multicast, routers set up forwarding state in the opposite direction of Unicast, from receiver to the root (e.g., a source in PIM-SSM or a rendezvous point in PIM-SM) of the distribution tree. Routers perform a reverse path forwarding (RPF) check to determine the interface of the router that is topologically closest to the root of the distribution tree. RPF is a central concept in multicast routing. In an RPF check, the router looks in a routing table to determine the RPF interface for a multicast group, which is the router interface topologically closest to the root of the distribution tree for the multicast group. The RPF interface is the incoming interface for the multicast group.

FIG. 1 shows in block diagram form an exemplary network 10 employing multicast communication. Network 10 includes multicast enabled routers RA-RH coupled together via communication links (e.g., T1 lines) 12a-12k. Network 10 enables hosts 14a-14c on LAN 16a to communicate with hosts 14d-14f on LAN 16b. LANs 16a and 16b may employ Ethernet technology. Routers RF-RH are directly connected to and provide multi-access to LAN 16b. Routers RF-RH are examples of first hop or edge routers.

Each multi-access network (e.g., LAN 16b) has a designated router (DR), which performs several functions. For example, DRs operate to register sources at the rendezvous point (RP), join directly connected hosts to the root of a distribution tree as receivers of multicast group as will be more fully described below.

Edge routers RF-RH periodically send PIM hello messages directly or indirectly to each other. The primary purpose of the PIM hello messages is to announce each router's existence as a PIM router, so that routers RF-RH can decide on a single DR. Each PIM hello message may contain a configured DR priority number of the router sending the message. The router with the highest DR priority number is elected DR for LAN 16b. If any of the routers RF-RH do not support the DR priority option, the DR is the router with the highest IP address. For purposes of explanation, it will be presumed that router RF is the DR for LAN 16b.

For purposes of explanation, presume host 14a sends data packets to multicast group GE1 as a source, and that host 14d seeks to join multicast group GE1 as a receiver. In general, hosts can join a multicast group as receivers using any one of many different internet group management protocols (IGMPs). To illustrate, host 14d can join multicast group GE1 by first generating an IGMP membership report in compliance with IGMPv1 or IGMPv2. The IP address of multicast group GE1 is included in the IGMP membership report generated by host 14d. It is noted that IGMP is the terminology used in IPv4. In IPv6, IGMP is referred to as multicast listener discovery (MLD).

The IGMP membership report is transmitted by host 14b to each of the edge routers RF-RH via LAN 16b. For purposes of explanation, it will be presumed that the distribution tree for multicast group GE1 has not been established through any of the edge routers RF-RH. In other words, multicast data packets for group GE1 are not transmitted to any host via LAN 16b before host 14d generates and transmits its IGMP membership report. Routers not elected DR drop the IGMP membership report. Thus, routers RG and RH drop the IGMP membership report transmitted by host 14d. Because router RF is the DR for LAN 16b, router RF uses a multicast routing protocol to join multicast group GE1 in response to receiving the IGMP membership report from host 14d.

Depending on the multicast protocol employed in network 10, the root of the distribution tree is a source or a rendezvous point. For purposes of explanation, it will be presumed that network 10 employs PIM-SSM. As such, source 14a is the root of the distribution tree for multicast group GE1, and the IGMP membership report from host 14d includes the IP address for source 14a. To build a distribution tree or to build a branch on the distribution tree rooted at source 14a, DR router RF executes an RPF check by scanning its routing table for the IP address of source 14a contained in the IGMP membership report. The RPF check tells DR router RF which of its interfaces is closest to the source. DR router RF knows that multicast data packets from source 14a to multicast group GE1 should flow into router RF through its RPF interface.

DR router RF then generates and sends a PIM Join message out the RPF interface to inform the next router upstream that it wants to receive multicast data packets from source 14a that are destined for group GE1. IN PIM-SSM, the PIM Join includes the IP addresses of the source and multicast group. In the example, DR router RF sends a PIM Join message that includes the IP addresses of source 14a and multicast group GE1. The upstream router receiving the PIM Join message adds the interface on which it was received to the OIL for the multicast group GE1 and performs an RPF check using the IP address of source 14a. This upstream router sends a PIM Join message out of its RPF interface informing its upstream router that it wants to join the multicast group GE1. Each upstream router repeats this process of propagating PIM Joins out the RPF interface until this new branch of the distribution tree either (1) reaches the router directly connected to source 14a, or (2) reaches a router that already has multicast forwarding state for multicast group GE1. In this way, a new branch of the distribution tree is created to receiver 14d. Once this branch is created and each of the routers has forwarding state for the source-group pair, multicast data packets can flow down the distribution tree from source 14a to receiver 14d.

Router RF is responsible for joining any host 14d-14f as a receiver for any multicast group since router RF is the DR on LAN 14b. Further, because RF is the DR, multicast data packets for each multicast group joined by hosts on LAN 16b will flow through router RF. This could lead to overburdening the processing bandwidth of router RF, at least when compared to the processing bandwidth of routers RG and RH.

BRIEF DESCRIPTION OF THE DRAWINGS

The present invention may be better understood, and its numerous objects, features, and advantages made apparent to those skilled in the art by referencing the accompanying drawings.

FIG. 3 illustrates a designated router map used by candidate designated routers in the network of FIG. 2;

The use of the same reference symbols in different drawings indicates similar or identical items.

DETAILED DESCRIPTION

Disclosed is an apparatus or method for assigning separate DRs to multicast groups or range of multicast groups. Using the present invention, for example, the DR assigned to a first multicast group or range of multicast groups is distinct from the DR assigned to a second multicast group or range of multicast groups. The present invention enables data packets for the first multicast group or range of multicast groups to be transmitted to a LAN via a DR that is distinct from the DR that transmits data packets to the LAN for the second multicast group or range of multicast groups. The present invention will be described with reference to a network employing IPv4, it being understood that the present invention may be implemented in a network employing IPv6.

The present invention can be employed in a router or other device (e.g., a general purpose or special purpose completer) which is configured to function as a router. Embodiments within the scope of the present invention also includes computer readable media that stores executable instructions, which when executed perform the function of electing a designated router as a function of a multicast group IP address or a range of multicast group IP addresses. Such computer readable media can be any available media which can be accessed by a processor within a router or other device (e.g., a general purpose or special purpose computer). By way of example, and not limitation, such computer readable media can include RAM, ROM, EEPROM, CD-ROM, or other optical disk storage, magnetic disk storage or other magnetic storage devices, magneto optical storage devices, or any other medium which could be used to store executable instructions which can be accessed directly or indirectly by a processor. Combinations of the above should also be included within the scope of the term computer readable media. Registers of a processing unit that store computer executable instructions while decoding and executing the same are also included within the scope of the term computer readable media. Lastly, the present invention contemplates application specific integrated circuits that perform the inventive functions described herein.

Figure 1:
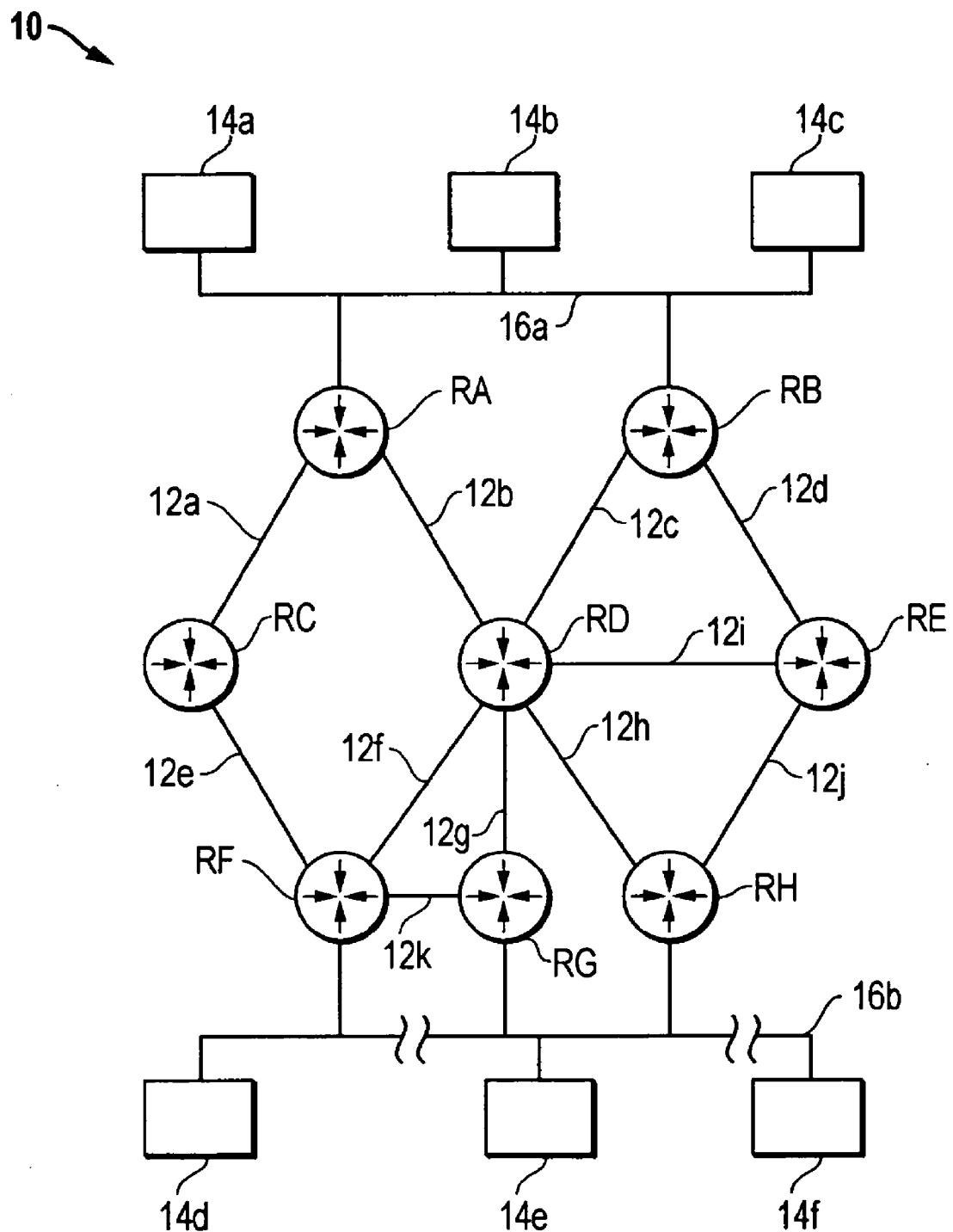
FIG. 1 illustrates a block diagram illustrating relevant components of a packet-switched network.
Figure 2:
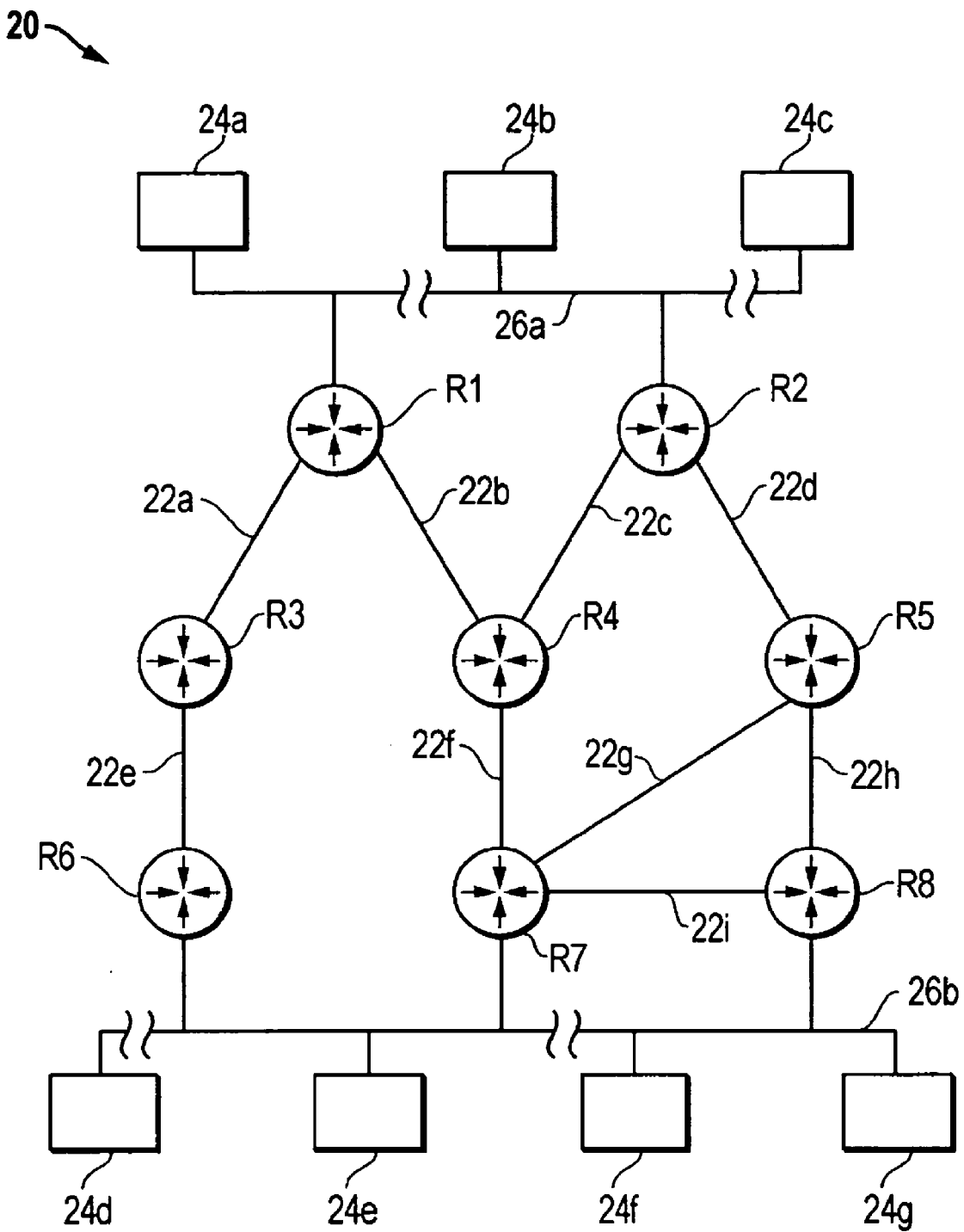
FIG. 2 shows illustrates a block diagram illustrating relevant components of an exemplary packet-switched network employing one embodiment of the present invention.

FIG. 2 is a block diagram showing relevant components of an exemplary network 20 employing one embodiment of the present invention. Network 20 includes PIM enabled routers R1-R8 coupled together via communication links 22a-22i. Network 20 enables multicast data communication between hosts 24a-24c on LAN 26a and hosts 22d-22g on LAN 26b. As noted above in the background section, since router RF coupled to LAN 16b is elected DR for all multicast groups, router RF may become overburdened while routers RG and RH, which are also coupled to LAN 16b, are underutilized. The present invention contemplates multiple DRs for load balancing multicast data packets transmitted to a subnet or LAN, such as LAN 26b. Using the present invention, for example, router R6 in FIG. 2 may be assigned as the DR for a multicast group G1 while routers R7 and R8 may be assigned as the DRs for distinct multicast groups G2 and G3, respectively. Alternatively, router R6 may be assigned as the DR for a first range of multicast groups, while routers R7 and R8 may be assigned as the DRs for second and third ranges, respectively, of multicast groups. Because multiple DRs are provided to LAN 26b, the transmission of multicast data packets to LAN 26b may be load balanced between routers R6-R8. For example, multicast data packets destined for receivers for multicast group G1 may flow through router R6 while multicast data packets destined for receivers of multicast groups G2 and G3 flow through routers R7 and R8, respectively.

In one embodiment of the present invention, each of the candidate DR routers coupled to a LAN implements an algorithm for calculating a weighting value V for each of the candidate DR routers when first selecting one of the routers as the DR for a multicast group. For example, each of the candidate DR routers R6-R8 in FIG. 2 calculates weighting values V(1), V(2), and V(3) for candidate DR routers R6-R8, respectively, using the same algorithm when selecting one of the routers R6-R8 as the DR for multicast group G2. In one embodiment, each weighting value is calculated as a function of the IP address of the multicast group for which a DR is sought to be selected and an IP address of a respective candidate router. For example, values V(1), V(2), and V(3) are calculated as a function of IPAG2 (the IP address of multicast group G2) and the IP addresses of routers R6, R7, and R8, respectively. Each router then compares the weighting values to each other to determine the numerically greatest (or least) weighting value. The router corresponding to the numerically greatest (or least) weighting value is then selected by each router as the DR for the multicast group. For example, each of the routers R6-R8 compares values V(1), V(2), and V(3) and determines that value V(2) is the numerically greatest. As such, each of the routers select router R7 (the IP address of which was used to calculate value V(7)) as the DR for multicast group G2.

Optionally, each router has a DR map stored in memory that maps multicast group IP addresses to DRs selected for the multicast groups. This DR map may be updated each time a DR is selected for a multicast group. FIG. 3 illustrates an exemplary DR map stored in each of the routers R6-R8. The DR map shown in FIG. 3a has five entries contained therein. As shown, each entry in FIG. 3 maps an IP address of a multicast group to a respective router that was selected as the DR for the multicast group. For example, the third entry in the DR map shown indicates that router R7 in FIG. 2 has been elected the DR for multicast group G2 identified by IP address IPAG2.

In one embodiment, the algorithm implemented by each of the edge routers R6-R8 to calculate weighting values V, is currently defined in the PIM specification. One reason for using this algorithm is that it is well defined and a proven algorithm that handles both IPv4 and IPv6 addresses. This algorithm is set forth below:

$$V(i) = (1103515245 * ((1103515245 * (IPAG\&M) + 12345) XOR C(i)) + 12345) \bmod 2^{31}$$

The algorithm above is a hashing algorithm that generates V as a hash value. Each value V is calculated as a function of IPAG, which is the IP address for multicast group G for which a DR is sought, M a mask length, and C(i) which is the IP address of a candidate DR. The * is a multiplier (e.g., 1*1=1), the & is a logical AND (e.g., 1 & 1=1, 1 & 0=0), the + is for adding values (e.g., 1+1=2), the ^ means 'to the power', (e.g., 2^2=4, 2^3=8, etc.). Finally, mod is modulo, or the remainder of the value calculated before the 'mod' divided by 2^31. A simpler example: 5 mod 2 is 1.

Each candidate DR maintains a list of IP addresses that includes the IP addresses of all candidate DRs. This IP address list provides the values for C(i). The number of candidate DR IP addresses in the list determines the number of weighting values that should be calculated by each router for each new multicast group.

The algorithm for calculating weighing values V may be initiated, in one embodiment, by each candidate DR coupled to a LAN when each of the candidate DRs receives an IGMP report from one of the hosts coupled to the LAN. To illustrate, suppose routers R6-R8 in FIG. 2 receive an IGMP report from one of the hosts coupled to LAN 26b. The IGMP membership report identifies the IP address for the multicast group that the host seeks to join as a receiver. In response to receiving the IGMP report, each of the routers R6-R8 calculates weighting values for each candidate DR coupled to LAN 26b as set forth above. Thereafter, each of the routers R6-R8 selects as DR the router that corresponds to the numerically greatest weighting value. The router selected as DR for the multicast group generates and transmits a PIM Join message to an upstream router while the other routers drop the IGMP membership report they received from the host coupled to LAN 26b.

Figure 4:
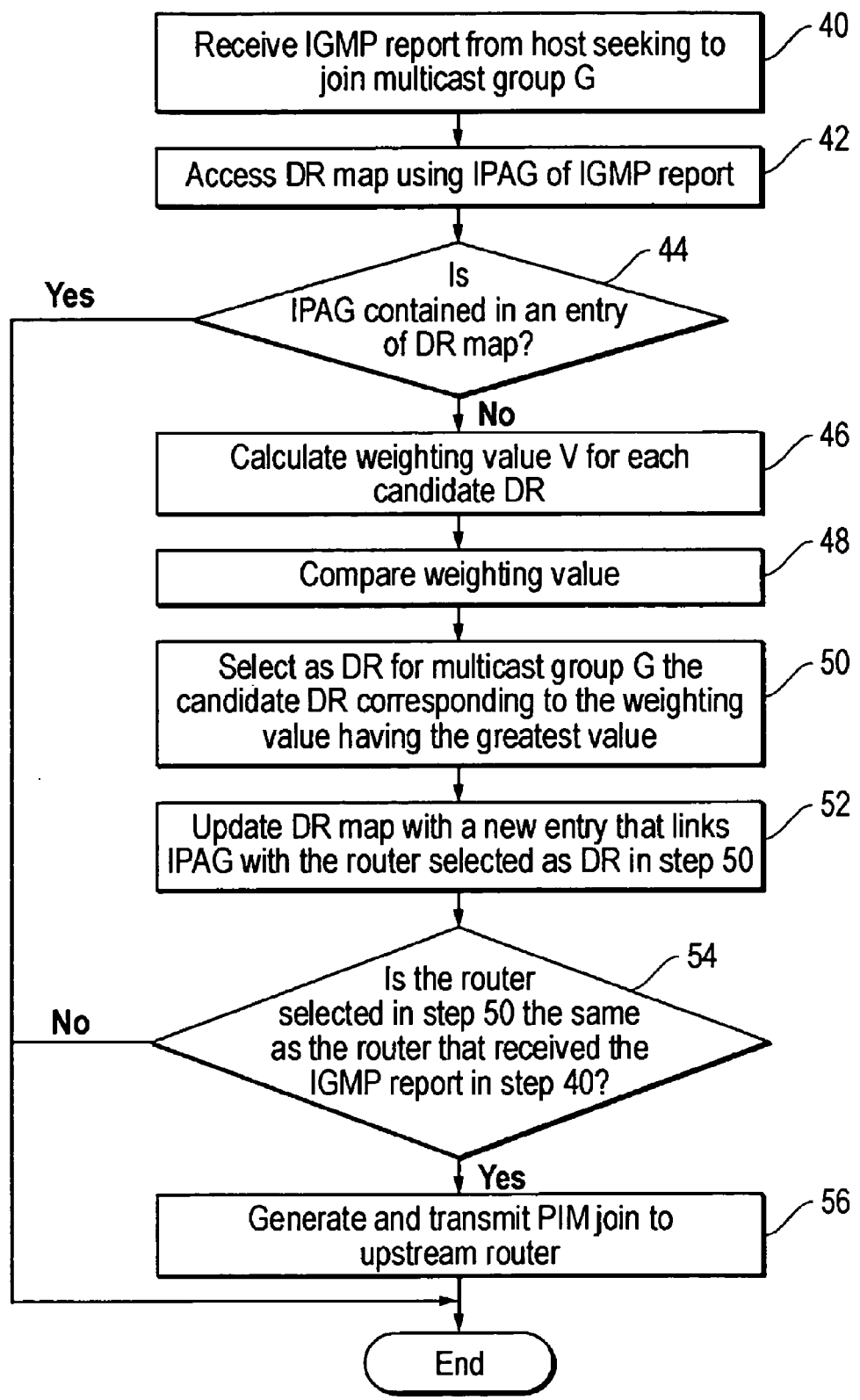
FIG. 4 is a flowchart showing relevant aspects of selecting a designated router according to one embodiment of the present invention.

FIG. 4 is a flowchart illustrating operational aspects of electing a DR for a multicast group according to an embodiment of the present invention. The process shown within FIG. 4 begins with step 40 when each of the candidate DRs coupled to a LAN receives an IGMP report from a host seeking to join multicast group G as a receiver. In step 42, each router accesses its DR map using IPAG, the IP address for multicast G of the IGMP report received in step 40. The DR map is accessed to determine whether IPAG is contained within an entry thereof. In step 44, if the IPAG is contained in an entry of the DR map, then a router has been elected DR for multicast group G and the process ends. If, however, in step 44 IPAG is not contained within an entry of the DR map, then each router, as shown in step 46, calculates a weighting value for each candidate DR router as a function of the IPAG as described above. Each router compares the weighted values it calculates to determine the numerically greatest (or least) in step 48. Thereafter in step 50, each router selects as DR for multicast group G the candidate router corresponding to the weighting value with the numerically greatest (or least) weighting value. In step 52, each router updates its DR map with a new entry that includes the IPAG and an identity (e.g., the IP address) of the DR selected for multicast group G. In step 54, each router determines whether it is the elected DR for multicast group G. The router that determines it is the selected DR for multicast group G generates and transmits a PIM join to an upstream router in order to establish a forwarding state for multicast group G. Each router that determines it is not selected as the DR for multicast group G, drops the IGMP report received in step 40.

Each router may use the hashing algorithm set forth above to calculate weighting values for comparison to determine the DR for a multicast group. This algorithm requires a value for the mask length M. All candidate DR routers must use the same algorithm and mask length M. The algorithm is predefined, but the mask length M can be configurable. To ensure that all routers use the same mask length M, the mask length can be advertised in the PIM hello messages exchanged between the candidate DR routers (e.g., routers R6-R8). Adding the mask length to the PIM hello messages may require a new option in the PIM hello message.

Figure 5:
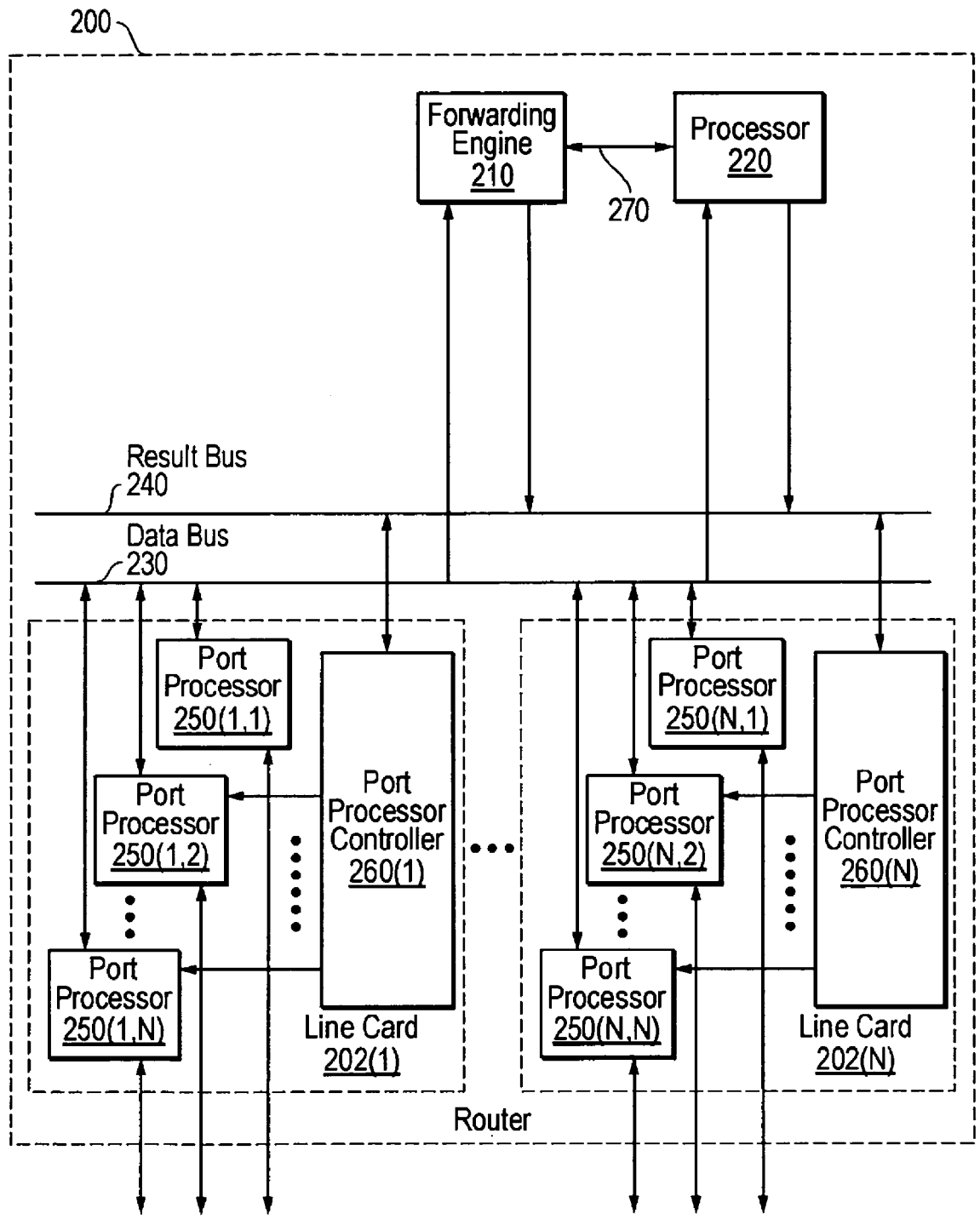
FIG. 5 illustrates relevant components of a router.

FIG. 5 is a block diagram illustrating relevant components of an exemplary router 200 that can implement one or more of the methods described above. Router 200 includes two or more line cards 202 that are communicatively coupled to a forwarding engine 210 and a processor 220 via a data bus 230 and a result bus 240. The processor can process instructions to implement the hashing algorithm above and generate the weighting values. Although not shown, router 200 may include a memory for storing the router's DR map and/or the list of candidate DRs. Each of line cards 202 may include one or more port processors 250 which are controlled by port processor controllers 260. It will also be noted that forwarding engine 210 and processor 220 are not only coupled to one another via data bus 230 and result bus 240, but are also communicatively coupled to one another by a communications link 270.

When a packet is received by a line card 202, the packet may be identified and analyzed in the following manner. The packet (or some or all of its control information) is sent from the receiving port processor 250 to one or more devices coupled to data bus 230 (e.g., another port processor, forwarding engine 210 and/or processor 220). Handling of the received packet can be determined by forwarding engine 210. For example, forwarding engine 210 may determine that the received packet should be forwarded to one or more of port processors 250. This can be accomplished by indicating to corresponding one or more port processor controllers 260 that a copy of the received packet should be forwarded to one or more appropriate port processors 250.

In the foregoing process, network security information can be included in a frame sourced by router 200 in a number of ways. For example, forwarding engine 210 can be used to detect the need for the inclusion of network security information in the packet, and processor 220 can be called into service to provide the requisite network security information. This network security information can be included in the packet during the transfer of the packet's contents from one port processor 250 to another port processor 250, by processor 220 providing the requisite information directly, or via forwarding engine 210, for example. The assembled packet can thus be made to contain the requisite network security information.

In addition, or alternatively, once a packet has been identified for processing, forwarding engine 210, processor 220 or the like can be used to process the packet in some manner or add packet security information, in order to secure the packet. On a node sourcing such a packet, this processing can include, for example, encryption of some or all of the packet's information, the addition of a digital signature or some other information or processing capable of securing the packet. On a node receiving such a processed packet, the corresponding process is performed to recover or validate the packet's information that has been thusly protected.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
a first router selecting a designated router for a first multicast group, wherein the selecting the designated router for the first multicast group comprises
the first router, in response to the first router receiving an IGMP membership report that comprises an IP address of the first multicast group,
generating a first value for the first router and a second value for a second router, wherein the first and second values are generated using a hash algorithm, and
using the first and second values to select itself or the second router as the designated router for the first multicast group, wherein
the first and second routers are on a network; and
the first router selecting a designated router for a second multicast group, wherein
the designated router for the first multicast group is distinct from the designated router for the second multicast group, and
the selecting the designated router for the second multicast group comprises
the first router, in response to the first router receiving an IGMP membership report that comprises an IP address of the second multicast group,
generating a third value for the first router and a fourth value for the second router, wherein the third and fourth values are generated using the hash algorithm, and
using the third and fourth values to select itself or the second router as the designated router for the second multicast group, wherein
the IP address of the first multicast group is distinct from the IP address of the second multicast group.

2. The method of claim 1 wherein the first router is one of a plurality of routers directly coupled to a LAN, and wherein the second router is one of the plurality of routers directly coupled to the LAN.

3. The method of claim 1 further comprising:
the second router selecting the designated router for the first multicast group, wherein the selecting the designated router for the first multicast group comprises
generating a fifth value for the first router and a sixth value for the second router, wherein the first and fifth values are identical and the second and sixth values are identical;
the second router selecting the designated router for the second multicast group, wherein the selecting the designated router for the second multicast group comprises
generating a seventh value for the first router and an eighth value for the second router, wherein the third and seventh values are identical and the fourth and eighth values are identical;
the second router selecting itself as the designated router for the second multicast group using the seventh and eighth values; and
the second router selecting the first router as the designated router for the first multicast group using the fifth and sixth values.

4. The method of claim 1 further comprising:
the first router receiving a first multicast data packet after the first router selects itself as the designated router for the first multicast group, wherein the first multicast data packet comprises first multicast data and the IP address of the first multicast group; and
the second router receiving a second multicast data packet after the first router selects the second router as the designated router for the second multicast group, wherein the second multicast data packet comprises second multicast data and the IP address of the second multicast group.

5. The method of claim 4 further comprising:
the first router transmitting the first multicast data to a LAN; and
the second router transmitting the second multicast data to the LAN.

6. The method of claim 1 further comprising:
the first router generating the first value as a function of an IP address of the first router and the IP address of the first multicast group;
the first router generating the second value as a function of an IP address of the second router and the IP address of the first multicast group;
the first router comparing the first value to the second value; and
the first router selecting itself as the designated router for the first multicast group in response to comparing the first and second values.

7. The method of claim 6 further comprising;
the first router generating the third value as a function of the IP address of the first router and the IP address of the second multicast group;
the first router generating the fourth value as a function of the IP address of the second router and the IP address of the second multicast group;

the first router comparing the third value to the fourth value; and the first router selecting the second router as the designated router for the second multicast group in response to comparing the third and fourth values.

8. An apparatus comprising:

a first router, the first router comprising:
  a first circuit for generating first and second values using a hash algorithm, wherein
    the first circuit, in response to the first router receiving an IGMP membership report that comprises an IP address of a first multicast group,
      generates the first value for the first router, and
      generates the second value for a second router, wherein
        the first and second routers are on a network, and
        the first router is configured to use the first and second values to select itself or the second router as a designated router for the first multicast group; and
  the first circuit further configured to generate third and fourth values using the hash algorithm, wherein
    the first circuit, in response to the first router receiving an IGMP membership report that comprises an IP address of a second multicast group,
      generates the third value for the first router, and
      generates the fourth value for the second router, wherein
        the first router is further configured to use the third and fourth values to select itself or the second router as a designated router for the second multicast group,
        the designated router for the first multicast group is distinct from the designated router for the second multicast group, and
        the IP address of the first multicast group is distinct from the IP address of the second multicast group.

9. The apparatus of claim 8 further comprising:
the second router, the second router comprising:
  a second circuit for generating fifth and sixth values, wherein the fifth value is generated for the first router, and wherein the sixth value is generated for the second router,
  wherein the first and fifth values are identical to each other, and
  wherein the second and sixth values are identical to each other.

10. The apparatus of claim 8 wherein the first router is configured to select itself or the second router as the designated router for the first multicast group, wherein the first router selects itself as the designated router for the first multicast group if the first value is numerically greater than the second value, and wherein the first router selects the second router as the designated router for the first multicast group if the second value is numerically greater than the first value.

11. The apparatus of claim 9 wherein the second router is configured to select itself or the first router as the designated router for the first multicast group, wherein the second router selects itself as the designated router for the first multicast group if the sixth value is numerically greater than the fifth value, and wherein the second router selects the first router as the designated router for the first multicast group if the fifth value is numerically greater than the sixth value.

12. The apparatus of claim 8 wherein the first router is configured to select itself or the second router as the designated router for the second multicast group, wherein the first router selects itself as the designated router for the second multicast group if the third value is numerically greater than the fourth value, and wherein the first router selects the second router as the designated router for the second multicast group if the fourth value is numerically greater than the third value.

13. The apparatus of claim 9 wherein the second circuit is configured to generate seventh and eighth values, wherein the seventh value is generated for the first router, and wherein the eighth value is generated for the second router, and wherein the third and seventh values are identical and the fourth and eighth values are identical.

14. An apparatus comprising:
means for generating values, wherein
  in response to a first router receiving an IGMP membership report that comprises
    an IP address of a first multicast group,
    a first value is generated for the first router using a hash algorithm, and
    a second value is generated for a second router using the hash algorithm, and
  in response to the first router receiving an IGMP membership report that comprises an IP address of a second multicast group,
    a third value is generated for the first router using the hash algorithm, and
    a fourth value is generated for the second router using the hash algorithm, wherein
      the IP address of the first multicast group is distinct from the IP address of the second multicast group; and
means for selecting a designated router, wherein
  the first router or the second router is selected as a designated router for the first multicast group using the first and second values,
  the first router or the second router is selected as a designated router for the second multicast group using the third and fourth values,
  the designated router for the first multicast group is distinct from the designated router for the second multicast group, and
  the first and second routers are on a network.

15. The apparatus of claim 14 wherein the means for selecting selects the first router as the designated router for the first multicast group if the first value is numerically greater than the second value, and wherein the means for selecting selects the second router as the designated router for the first multicast group if the first value is numerically less than the second value.

16. The method of claim 1 wherein the first router selects itself as the designated router for the first multicast group if the first value is numerically greater than the second value, and wherein the first router selects the second router as the designated router for the first multicast group if the second value is numerically greater than the first value.

17. The method of claim 3 wherein the second router selects itself as the designated router for the first multicast group if the sixth value is numerically greater than the fifth value, and wherein the second router selects the first router as the designated router for the first multicast group if the fifth value is numerically greater than the sixth value.

18. The method of claim 8 wherein the first value is generated as a function of the first router's IP address and the IP address of a first multicast group, the second value is generated as a function of the second router's IP address and the IP address of the first multicast group, the third value is generated as a function of the first router's IP address and the IP address of the second multicast group, and the fourth value is generated as a function of the second router's IP address and the IP address of the second multicast group.

* * * * *